(12) United States Patent
Gillet et al.

(10) Patent No.: US 8,544,632 B2
(45) Date of Patent: Oct. 1, 2013

(54) DEVICE FOR CONVEYING PREFORMS IN A HEATING UNIT

(75) Inventors: Denis Gillet, Octeville sur Mer (FR); Patrice Andreux, Octeville sur Mer (FR); Damien Muzzolini, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 91 days.

(21) Appl. No.: 13/383,465

(22) PCT Filed: Jul. 15, 2010

(86) PCT No.: PCT/EP2010/060251
§ 371 (c)(1),
(2), (4) Date: Jan. 11, 2012

(87) PCT Pub. No.: WO2011/009805
PCT Pub. Date: Jan. 27, 2011

(65) Prior Publication Data
US 2012/0111700 A1    May 10, 2012

(30) Foreign Application Priority Data

Jul. 21, 2009    (FR) ..................................... 09 55051

(51) Int. Cl.
*B29C 49/68* (2006.01)
*B29C 49/42* (2006.01)
*B65G 17/42* (2006.01)
*B29C 49/06* (2006.01)

(52) U.S. Cl.
USPC ................ 198/465.2; 198/470.1; 198/867.02; 198/834; 198/835; 198/847; 425/534

(58) Field of Classification Search
USPC  198/465.1–465.2, 470.1, 487.4, 867.01–867.08, 198/803.3–803.1, 803.12, 834, 835, 847; 425/534
See application file for complete search history.

(56) References Cited

U.S. PATENT DOCUMENTS

| 3,590,982 A | * | 7/1971 | Banyas ....................... 198/470.1 |
| 4,690,633 A | * | 9/1987 | Schad et al. .................. 425/526 |
| 4,723,906 A | * | 2/1988 | Gibbemeyer ................. 425/534 |
| 5,558,200 A | * | 9/1996 | Whitby et al. ............. 198/470.1 |
| 6,325,198 B1 | * | 12/2001 | Pattantyus-Abraham et al. ........................ 198/339.1 |

(Continued)

FOREIGN PATENT DOCUMENTS

| DE | 197 27 355 A1 | 1/1999 |
| EP | 0 248 376 A2 | 12/1987 |
| EP | 0 266 804 A2 | 5/1988 |
| WO | 01/64424 A1 | 9/2001 |

OTHER PUBLICATIONS

International Search Report, dated Oct. 26, 2010, from corresponding PCT application.

*Primary Examiner* — Mark A Deuble
(74) *Attorney, Agent, or Firm* — Young & Thompson

(57) ABSTRACT

A device (10) for conveying at least one preform (12) in a preform heating unit (12), the conveying device (10) including a conveyor belt which includes at least: a main traction belt (14a) which engages with rotary elements (16a, 16b); and a secondary support belt (14b) which is movably connected to the main belt (14a) by a connecting element (24), and to which at least one support device (34) of at least one preform (12) is attached by an attachment element (36).

11 Claims, 2 Drawing Sheets

(56) References Cited

U.S. PATENT DOCUMENTS

| | | | |
|---|---|---|---|
| 6,422,379 B1 * | 7/2002 | Zoppas | 198/803.12 |
| 6,976,836 B2 * | 12/2005 | Suzuki | 425/526 |
| 7,681,713 B2 * | 3/2010 | Nishi et al. | 198/470.1 |
| 7,681,720 B2 * | 3/2010 | Monti | 198/867.01 |
| 2004/0161486 A1 * | 8/2004 | Pickel | 425/174.4 |
| 2009/0133993 A1 * | 5/2009 | Ishikawa et al. | 198/840 |

* cited by examiner

DEVICE FOR CONVEYING PREFORMS IN A HEATING UNIT

The invention concerns a device for conveying preforms in a heating unit.

The invention concerns more particularly a device for conveying at least one preform in a preform heating unit, the conveyor device including:
- at least one endless conveyor belt that is driven in movement,
- at least two rotary elements for driving the conveyor belt each of which is mounted to turn about an axis and which cooperate with the conveyor belt to drive it in movement in a closed loop path,
- at least one support device for at least one preform that is connected to the conveyor belt to move therewith and that is adapted to carry the preform.

The invention relates to the field of the manufacture of thermoplastic material hollow bodies or containers, such as bottles, flasks, etc.

To manufacture such a container, a preform is first produced by injection molding, notably in a thermoplastic material such as PET (polyethylene terephthalate).

The preform is then intended to be conditioned thermally, that is to say heated in a heating unit including at least one oven, after which the preform is ready to be transformed by means of at least one fluid under pressure, notably by blowing or by drawing/blowing by means of a blowing machine enabling the final container to be obtained.

The preform obtained by injection molding generally has a tubular cylindrical body that is closed at one of its axial ends and extended at its other end by a neck, also tubular.

To be able to carry out this blowing operation, it is necessary for the body of the preform to be heated to a temperature higher than the glass transition temperature of the thermoplastic material.

To this end, the preform is heated by causing it to circulate inside an oven along a heating path by means of an endless conveyor device.

The oven includes heating means, constituted for example by infrared lamps disposed over some or all of the heating path and in front of which the body of the preform is moved by the transport device, generally while being rotated upon itself.

Each preform is generally retained on the conveyor device by an associated support device including handling means.

In a known manner, the preform conveyor device includes an endless chain that is driven in movement along a closed loop path inside the oven by motorized means.

The chain is constituted of a succession of links connected together two by two by a bearing, with the result that the chain constitutes a succession of articulated links. The chain is adapted on the one hand to be driven along said looped path and on the other hand to transmit this movement to the preform support devices that are connected to it and that it supports.

Each preform support device is connected to the chain to move with it and mounted on and fastened to at least one associated link of the chain.

The preform support devices are juxtaposed along the chain and as close as possible to each other so that a given length of the chain carries a maximum number of preforms in order to optimize the ratio between the length of the chain, which is incidentally that of the oven, and the number of preforms heated, all of this for reasons of throughput and efficiency.

However, although the chain constitutes satisfactory conveyor means, it has some drawbacks.

In fact, the maximum number of support devices carried by the chain determines a pitch that depends on the links of the chain, notably on the distance between centers, that is to say the distance that separates the bearings of two consecutive links.

The minimum value of the pitch between two consecutive supports is therefore limited by the necessity to respect a minimum length, for example 40 millimeters, to guarantee that the chain is sufficiently strong.

Now, it has been found that the quality of heating of the preforms is improved if the pitch between them is small.

Moreover, relative movements of the articulated links of the chain are a source of wear of the chain, in particular of the bearings. It is possible partly to limit this wear by lubricating the chain.

However, lubricating the chain on the one hand requires frequent service and maintenance operations, which is costly, and on the other hand is a source of pollution of the preforms because of the risk of the lubricant splashing inside the oven.

There is known, for example from the document WO-A1-01/64424, a conveyor device including an endless belt that is driven in rotation by drive means and to which are connected to move with it support means for preforms intended to be heated in an oven.

However, in the above document, as beforehand in other prior art devices using a chain made up of links, the conveyor member formed by the belt on the one hand transports the preform along a closed loop path and on the other hand carries the preform support means.

These conveyor device designs are not entirely satisfactory if, firstly, the belt like the chain must have a very high mechanical strength to withstand on the one hand the traction forces and on the other hand the load consisting of all the support means.

Then, the operations of mounting and demounting such conveyor members are particularly complex and necessitate the heating unit to be shut down for very long periods while they are carried out.

The invention aims notably to propose a conveyor device for remedying these drawbacks.

With this aim, the invention proposes a conveyor device of the type described above characterized in that the conveyor belt includes at least:
- a main traction band that cooperates with said rotary elements, and
- a secondary support band that is connected to the main band to move with it by connecting means and to which at least one support device is attached by attachment means.

The maintenance operations for lubricating the chain and the risks of pollution are advantageously eliminated by the use of a belt.

The invention advantageously enables optimization of the design of each of the bands of the belt in respect of its own function, the namely driving function for the main band and the support function for the secondary band, respectively.

Thanks to the invention, the operations of changing the support means mounted on and fastened to the secondary belt by way of the attachment means are particularly easy and fast to carry out, without it being necessary to demount the traction main belt or to demount the support devices one by one.

The support secondary band of the belt is advantageously driven perfectly synchronously by the traction main belt thanks to the connecting means connecting them so that they move together.

According to other features of the invention:

the widths of main band and the secondary band of the belt each extend vertically and the secondary band is arranged above the main band so that the main band and the secondary band have the same radius of curvature around said vertical axes during driving of the belt;

the main band is produced in one piece in such a manner as to form a closed loop around said vertical axes;

each rotary element, forming a toothed wheel, delimits a series of teeth that cooperate with a series of complementary vertical teeth of the main band of the belt in order to drive movement of the belt;

the means for attaching the support device for preforms to the belt include at least one vertical strip that is fixed to the support device with the result that the secondary band is disposed and clamped between the support device and said strip, thanks to which the support device and the associated secondary band are connected to each other;

the strip cooperates with at least one tooth of the secondary band to immobilize the strip on the belt in the direction of forward movement of the belt;

the secondary band is produced in a plurality of sections that are arranged end-to-end and each of which is connected to the main band to move therewith by said connecting means, and a plurality of support devices are attached to each section by said attachment means;

the means for connecting the secondary band to the main band include at least one first clamp and one second clamp that extend vertically face-to-face and are connected to each other, the main band and the secondary band being disposed and clamped between the clamps in such manner as to connect said bands to each other, and at least the first clamp cooperates with at least one tooth of the secondary band and one tooth of the main band in such manner as to immobilize said bands relative to each other in the direction of forward movement of the belt;

the belt includes an additional secondary band that is of symmetrical design to the secondary band in a horizontal plane of symmetry passing through the main band.

Other features and advantages of the invention, as well as design and implementation details, will become apparent on reading the following detailed description, to understand which reference should be had to the appended drawings, in which.

In the description and the claims, by nonlimiting convention, the terms "upper" and "lower" used with reference to the vertical direction and the longitudinal, vertical and transverse directions relate to the trihedral axes (L, V, T) shown in the figures.

Figure 1:
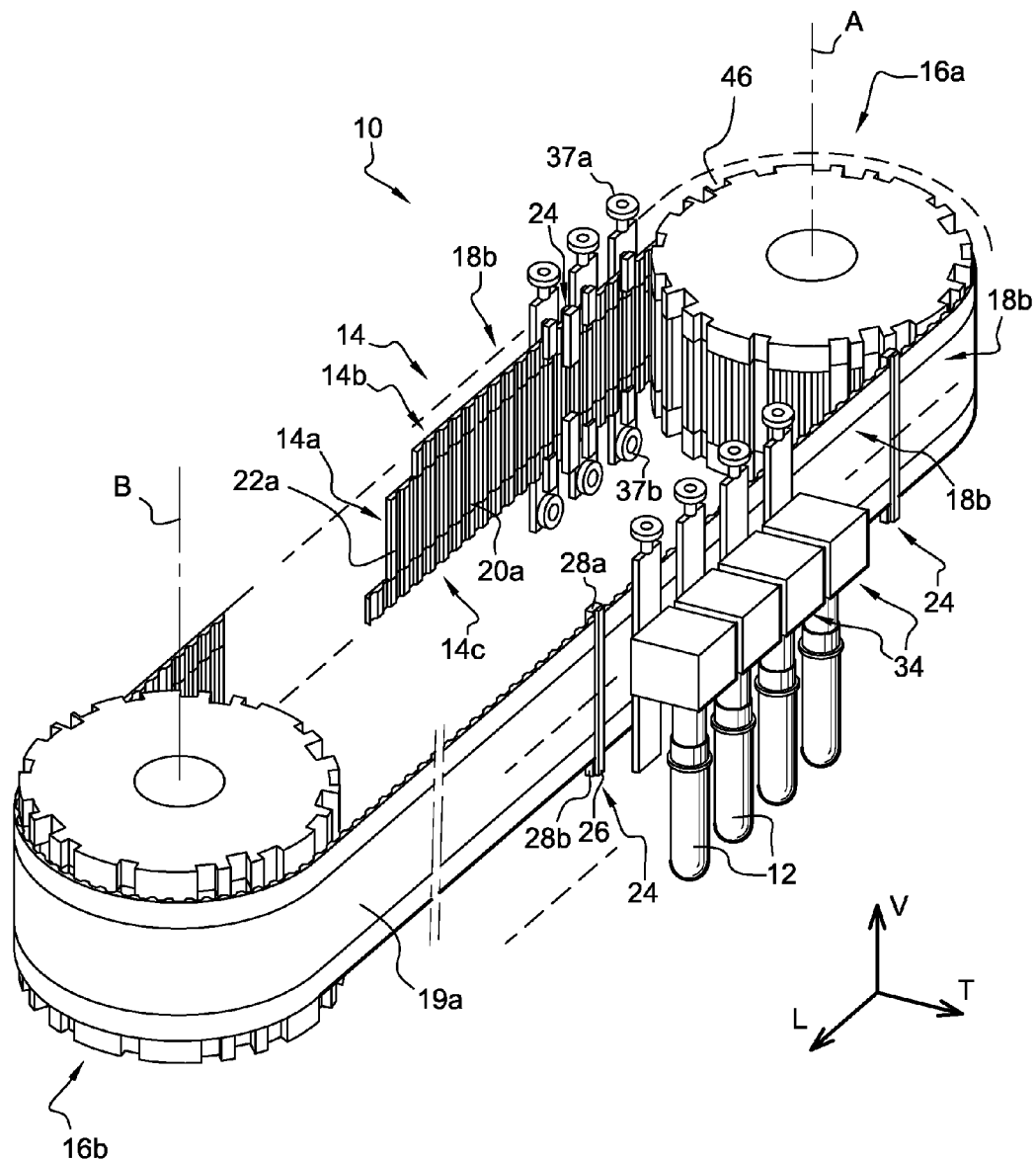
FIG. 1 is a perspective view that shows the conveyor device of the invention including a belt tensioned between two wheels.

FIG. 1 shows a device 10 for conveying preforms 12 adapted to transport the preforms 12 along a heating path in an oven (not shown) adapted to heat the preforms 12.

The convey device 10 includes a belt 14 that is driven in movement in the oven along a looped heating path, here a path of oval shape, in a horizontal plane, about a first vertical axis A and a second vertical axis B.

To this end, the width of the belt 14 extends vertically downward and the belt is tensioned between a first toothed wheel 16a, which is advantageously a driving wheel, and a second toothed wheel 16b, which wheels are respectively mounted to turn about the first vertical rotation axis A and the second vertical rotation axis B.

The second toothed wheel 16b is for example mounted so as to be mobile along a horizontal axis that passes through the centers of the two wheels 16a, 16b in order to facilitate mounting, demounting and adjusting the tension of the belt 14.

The belt 14 is of generally symmetrical design with respect to a horizontal plane of symmetry (not shown) corresponding to a plane (L, T) that passes through the middle of the belt 14.

The driving first toothed wheel 16a is driven in rotation by motorized means (not shown), for example by an electric motor.

The belt 14 forms a closed loop that includes at least one main band 14a.

The belt 14 preferably further includes a first secondary band 14b at the top and/or a second secondary band 14c at the bottom, the lower second band 14c being symmetrical to the upper first band 14b.

The main band 14a, called the traction band, has the function of driving a series of support devices 34 for the preforms 12 and is adapted to receive driving power from the first toothed wheel 16a in order to drive movement of the support devices 34 along the heating path.

To make the figures more legible, FIG. 1 shows only a limited number of support devices 34.

The main band 14a is preferably produced in one piece to increase the mechanical tensile strength of the belt 14.

The main band 14a is produced in an elastomer material, for example by molding, and is reinforced by a series of horizontal cables (not shown) that are embedded in the main band 14a and are superposed vertically in a regular manner, the combination of the band plus the cables being circumferentially continuous with the result that the main band 14a is a closed loop.

However, without this being limiting on the invention, the main band 14a may be produced in the form of an open rectilinear band the two free ends of which are adapted to be connected to each other by connecting means to form a closed loop.

The main band 14a has an external vertical face 19a and an internal vertical driving face 20a that faces the two wheels 16a, 16b.

The internal vertical face 20a delimits a series of driving teeth 22a that extend vertically downward, preferably over the entire width of the main band 14a, and cooperate with the complementary teeth of the two toothed wheels 16a, 16b to drive movement of the belt 14.

The upper band 14b is arranged above the main band 14a.

The upper band 14b preferably bears vertically on a horizontal upper edge 21a of the main band 14a.

The lower band 14c is arranged below the main band 14a and preferably bears vertically on a horizontal lower edge 21b of the main band 14a.

Alternatively, the upper band 14b and/or the lower band 14c does not bear vertically on the corresponding edge of the main band 14a with the result that a gap or clearance exists between said bands 14a, 14b and/or 14c of the belt 14.

The main band 14a, the upper band 14b and the lower band 14c are curved around the two vertical axes A, B with the same radius of curvature, i.e. the main band 14a, the upper band 14b and the lower band 14c are coplanar and lie in the same vertical plane.

Thus the bands 14a, 14b, 14c are not moved angularly relative to each other during the driving of the belt 14.

Here the different functions are advantageously dissociated and respectively provided by at least one of the bands 14a, 14b, 14c.

Thus the function of the main band 14a, called the traction band, is to cooperate with the wheels 16a, 16b the rotation movement whereof transmitted by the latter wheels causes the band to be moved along the endless path corresponding to the heating path in the oven.

The upper band 14b has a main function that is separate from the driving function of the main band 14a, in that it has a function of supporting the devices 34 for supporting the preforms 12 and its movement, and consequently that of the support devices 34, is obtained by connecting the upper band 14b to the main band 14a of the belt 14, which drives it.

The lower band 14c has the same support function as the upper band 14b. The lower band 14c and the upper band 14b enable connection of the support devices 34 respectively to a high point and to a low point of the belt 14, notably in order prevent swaying of the support devices 34.

The upper band 14b has an external vertical face 19b and an attachment internal vertical face 20b facing the two wheels 16a, 16b.

The internal vertical face 20b delimits a series of teeth 22b that extend vertically downward, preferably over the entire width of the upper secondary band 14b.

The upper band 14b is advantageously not produced in one piece but has a structure that is open or able to open.

The upper band 14b preferably includes a plurality of separate sections 18b adapted to be assembled to each other to form an upper band 14b forming a closed loop.

The sections 18b are arranged end to end, each section 18b being individually and removably connected to the main band 14a, so as to move therewith, by two associated connecting means 24.

Similarly, by virtue of symmetry with respect to the horizontal plane of symmetry, the lower band 14c has an external vertical face 19c and an attachment internal vertical face 20c that faces the two wheels 16a, 16b.

The internal vertical face 20c delimits the series of teeth 22c that extend vertically downward, preferably the entire width of the lower secondary band 14c.

Figure 2:
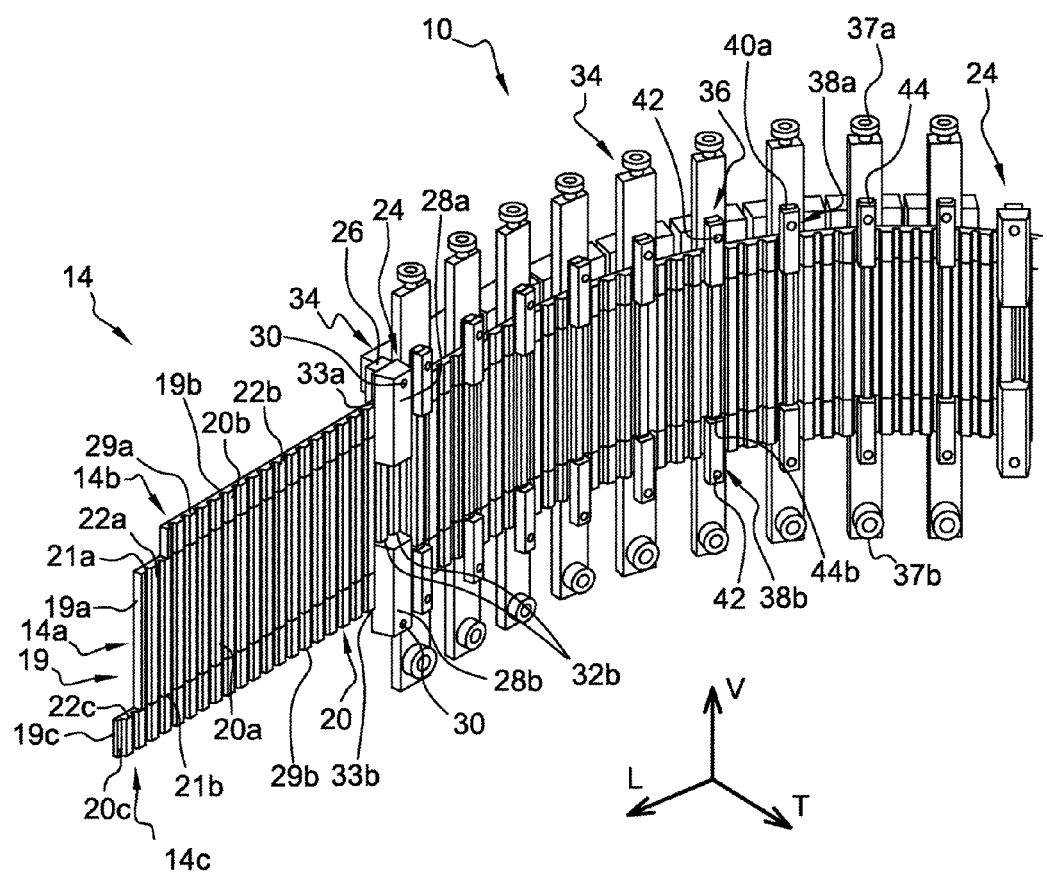
FIG. 2 is a detail perspective view that shows the means for attaching the support devices to the belt and the devices for connecting the upper and lower bands to the main band of the belt from FIG. 1.

As may be seen in FIG. 2, the teeth 22a, 22b, 22c of the main band 14a, the upper band 14b and the lower band 14c are aligned vertically with each other.

In FIG. 2, each connecting means 24 includes an external clamp 26 that lies vertically against a vertical external face 19 of the belt 14 and an upper internal clamp 28a and a lower internal clamp 28b that lie vertically against an internal face 20 of the belt 14, facing the external clamp 26, so that the clamps 26, 28a, 28b project vertically upward and downward relative to the belt 14.

The upper vertical end of the external clamp 26 is fixed to the upper internal clamp 28a, for example by means of a screw 30, with the result that the upper band 14b and a portion of the main band 14a are disposed and clamped between the external clamp 26 and the upper internal clamp 28a.

Similarly, by virtue of symmetry with respect to the horizontal plane of symmetry, the lower vertical end of the external clamp 26 is fixed to the lower internal clamp 28b, for example by means of a screw 30, with the result that the lower band 14c and a portion of the main band 14a are disposed between and clamped between the external clamp 26 and the lower internal clamp 28b.

The upper internal clamp 28a advantageously delimits a shoulder forming a horizontal face 33a that bears vertically against the upper edge 29a of the upper band 14b in order to lock the upper band 14b vertically to the main band 14a.

Similarly, the lower internal clamp 28b delimits a shoulder forming a horizontal face 33b that bears vertically against the lower edge 29b of the lower band 14c to lock the lower band 14c vertically to the main band 14a.

Finally, the upper internal clamp 28a delimits a pair of vertical grooves (not shown) that cooperate both with a pair of complementary teeth 22b of the upper band 14b and a pair of teeth 22a of the main band 14a in order to lock the main band 14a horizontally to the upper band 14b in the direction of forward movement of the belt 14.

Similarly, the lower internal clamp 28b delimits a pair of vertical grooves 32b that cooperate both with a pair of complementary teeth 22c of the lower band 14c and a pair of teeth 22a of the main band 14a to lock the main band 14a horizontally to the lower band 14c in the direction of forward movement of the belt 14.

Thus the main band 14a, the upper band 14b and the lower band 14c are locked together so that they move together, being immobilized relative to each other vertically and horizontally in the direction of forward movement of the belt 14.

According to another aspect, each support device 34 for the preforms 12 is removably attached to the belt 14 by attachment means 36 facing the external face 19 of the belt 14.

Each support device 34 is adapted to take up a preform 12 at the entry of the oven, to hold it, to move it along the heating path, and then to release the preform 12 at the exit of the oven to transfer it.

Moreover, each support device 34 includes an upper wheel 37a and a lower wheel 37b each of which is adapted to cooperate with a guide path in order to guide the associated support device 34 along the heating path inside the oven.

In FIG. 2, the attachment means 36 include an upper strip 38a that lies vertically against the internal face 20b of the upper band 14b of the belt 14 and has a free upper end projecting upward relative to the upper band 14b.

In complementary fashion, the associated support device 34 includes an upper stud 40a that faces the upper strip 38a and is fixed to the upper end of the upper strip 38a, for example by a screw 42, so that the upper band 14b is disposed and clamped between the support device 34 and the upper strip 38a.

Moreover, the upper strip 38a delimits a vertical notch 44a that cooperates with a complementary tooth 22b of the upper band 14b of the belt 14 and with the upper stud 40a of the support device 34 to lock the upper band 14b horizontally to the associated support device 34 in the direction of forward movement of the belt 14.

Finally, the upper stud 40a of the support device 34 bears vertically against the upper edge 29a of the upper band 14b of the belt 14 in order to lock the upper band 14b and the support device 34 together vertically.

Similarly, with respect to the horizontal plane of symmetry, the attachment means 36 include a lower strip 38b that lies vertically against the internal face 20c of the lower band 14c of the belt 14 and includes a lower free end projecting downwardly relative to the lower band 14c.

In complementary fashion, the associated support device 34 includes a lower stud (not shown) that faces the lower strip 38b and is fixed to the lower end of the lower strip 38b, for example by a screw 42, so that the lower strip 14c is disposed and clamped between the support device 34 and the lower strip 38b.

Moreover, the lower strip 38b delimits a vertical notch 44b that cooperates with a complementary tooth 22c of the lower band 14c of the belt 14 and with the lower stud of the support device 34 in order to lock the lower band 14c horizontally to the associated support device 34 in the direction of forward movement of the belt 14.

Finally, the lower stud of the support device 34 bears against the lower edge 29b of the lower band 14c of the belt 14 in order to lock the lower band 14c and the support device 34 together vertically.

In a complementary way, in FIG. 1, each toothed wheel 16a, 16b delimits a plurality of vertical notches 46 the shape of which is complementary to the shape of the internal clamps 28a, 28b and the strips 38a, 38b so that the wheels 16a, 16b do not crush the internal clamps 28a, 28b and the strips 38a, 38b upon meshing of the belt 14 with the wheels 16a, 16b.

As may be seen in FIG. 1, the support devices 34 are attached in batches to a pair of bands constituted of an associated upper section 18b of the upper band 14b and an associated lower section 18c of the lower band 14c of the belt 14, with the result that it is possible to detach or to attach the support devices 34 in batches or groups of "n" support devices 34 by means of the associated connecting devices 24.

This feature notably enables fast mounting and demounting of the support devices 34 on and from the belt 14, the support devices advantageously being mounted and demounted in groups of "n" support devices 34 fastened to at least one section 18b, 18c of the secondary band 14b, 14c.

Nevertheless, each support device 34 may be detached individually from the belt 14 thanks to the attachment means 36 associated with each support device 34, notably for maintenance or to work on a given support device 34.

Finally, the teeth 22a, 22b, 22c of the belt 14 are aligned with each other along a vertical line and are advantageously regularly distributed in the horizontal direction with the result that the teeth 22a, 22b, 22c constitute a visual marker to facilitate regular distribution of the support devices 34 on the belt 14.

The belt 14 advantageously enables reduction of the pitch between two consecutive support devices 34, i.e. also between two successive preforms 12.

Of course, the invention is in no way limited to the preferred embodiment described with reference to FIGS. 1 and 2.

For an equivalent length, a belt 14 advantageously has a weight less than that of a chain consisting of links, which facilitates manipulation thereof when working on the conveyor device 10.

In a variant, the belt 14 includes at least two separate parts, namely a main band 14a for driving the belt 14 and a single secondary band, for example an upper secondary band 14b, for attaching the support devices 34 for the preforms.

Alternatively, the main band 14a does not include teeth and cooperates with the wheels 16a, 16b by friction.

Alternatively, the lower band 14c and/or the upper band 14b do not include teeth.

By comparison with a chain consisting of links, the number of support devices 34 for preforms 12 is no longer limited by a minimum distance between centers, thanks to which the minimum pitch between two consecutive preforms 12 is advantageously small in a belt 14 of the invention of this kind.

In this variant, as in the embodiment described and shown above, the dissociation of the driving and support functions and their respective assignment to one of the bands forming the belt 14 advantageously enables the choice of each of them to be optimized.

The main band 14a is preferably a closed loop to guarantee optimum tensile strength and reliable operation.

In contrast, said at least one secondary support band 14b, 14c is advantageously an open loop, to be more precise a band formed of different sections 18b, 18c thanks to which it is easy to mount and demount a group of support devices 34.

In fact, as a function of the size of the oven, if the belt 14 formed of one or more bands reaches a certain length, it is then sometimes difficult to demount it quickly with the result that changing the support devices 34 is then effected by individually demounting the support devices 34 one by one, which takes time and increases costs.

If the belt 14 includes at least two bands, respectively a main band 14a and a secondary band 14b, 14c, only the secondary support band 14b, 14c must then be demounted, which is advantageous, and its design consisting of sections 18b enables fast and easy mounting/demounting of the secondary band 14b, 14c.

Using such an embodiment, for each section 18b of secondary band 14b, 14c that is demounted, a number n of support devices 34 that this section includes is simultaneously demounted.

Then only the secondary bands 14b, 14c are demounted, which is advantageous, without it being necessary to work on the main traction band 14a providing the driving function and interengaged with the wheels 16a, 16b.

Producing a band in multiple sections in this way, notably but not exclusively in the case of the secondary support bands 14b, 14c of the belt 14, advantageously offers the possibility of a significant cost reduction as it is possible to standardize these components for different types of oven of different sizes.

In fact, the conveyor devices 10 then include a belt 14 that corresponds to a particular number of sections assembled to form at least the secondary band 14b, 14c for supporting the support devices 34 for the preforms 12, and to each band of a given length there corresponds an oven of a particular length also determined in relation to the heating path of the preforms 12.

If the oven is of modular design, it is advantageously also possible to use a modular design for the conveyor device 10 and its belt 14.

It is clear that the belt 14 of the invention is produced as at least two separate bands, respectively a main band 14a and secondary bands 14b, 14c, each of which has one of said functions as its main function.

Such a belt 14 is adapted to be used in an existing heating unit by adapting and modifying the conveyor device 10.

According to a variant that is not shown, the conveyor device 10 includes a conveyor member obtained by partially modifying a prior art device to add thereto at least one band 14b, 14c intended to provide the support function of the support devices 34 for the preforms whilst retaining a chain consisting of links to provide the driving function, said at least one band providing the support function being coupled to move with the chain consisting of links and together forming the conveyor member.

In such a variant, the risks of pollution associated with the presence of the chain and lubricant are lower than previously thanks to the greater distance between the support devices 34 for the preforms 12, which are advantageously offset vertically.

The modifications to be made to the conveyor device 10 of the heating unit are then advantageously less extensive, but according to an important feature the use of a belt, such as a secondary band 14b, 14c, to provide the support function enables all of the aforementioned advantages to be obtained.

In fact, there is then obtained a conveyor device 10 in which the support devices 34 are mounted on and fastened to at least one belt 14b, 14c advantageously produced in the form of different sections assembled end-to-end to facilitate mounting and demounting a plurality of support devices 34 for preforms 12, and moreover simultaneous mounting and demounting thereof.

Said belt providing the support function and, with the chain, forming the conveyor member is advantageously produced in multiple sections the unit length of which is determined to enable rapid and easy manipulation by an operator in order notably to reduce servicing time and heating unit down time.

The chain consisting of links is nevertheless preferably eliminated and the drive function within the conveyor device 10 also provided by a belt, such as the main belt 14*a*, in order to guarantee a cleaner environment in the vicinity of the support devices 34 for the preforms 12 thanks to the absence of lubricant.

The invention claimed is:

1. A device (10) for conveying at least one preform (12) in a unit for heating preforms (12), the conveyor device (10) including:
    at least one endless conveyor belt (14) that is driven in movement,
    at least two rotary elements (16*a*, 16*b*) for driving the conveyor belt (14) each of which is mounted to turn about an axis (A, B) and which cooperate with the conveyor belt (14) to drive it in movement in a closed loop path,
    at least one support device (34) for at least one preform (12) that is connected to the conveyor belt (14) to move therewith and that is adapted to carry the preform (12),
    characterized in that the conveyor belt (14) includes at least:
    a main traction band (14*a*) that cooperates with said rotary elements (16*a*, 16*b*), and
    a secondary support band (14*b*) that is connected to the main band (14*a*) to move with it by connecting means (24) and to which at least one support device (34) is attached by attachment means (36).

2. The conveyor device (10) as claimed in claim 1, characterized in that the widths of the main band (14*a*) and the secondary band (14*b*) of the belt (14) each extend vertically and in that the secondary band (14*b*) is arranged above the main band (14*a*) so that the main band (14*a*) and the secondary band (14*b*) have the same radius of curvature around said vertical axes (A, B) during driving of the belt (14).

3. The conveyor device (10) as claimed in claim 2, characterized in that the main band (14*a*) is produced in one piece in such a manner as to form a closed loop around said vertical axes (A, B).

4. The conveyor device (10) as claimed in claim 1, characterized in that each rotary element (16*a*, 16*b*), forming a toothed wheel, delimits a series of teeth that cooperate with a series of complementary vertical teeth (22*a*) of the main band (14*a*) of the belt (14) in order to drive movement of the belt (14).

5. The conveyor device (10) as claimed in claim 1, characterized in that the means (36) for attaching the support device (34) for preforms (12) to the belt (14) include at least one vertical strip (38*a*) that is fixed to the support device (34) with the result that the secondary band (14*b*) is disposed and clamped between the support device (34) and said strip (38*a*), thanks to which the support device (34) and the associated secondary band (14*b*) are connected to each other.

6. The conveyor device (10) as claimed in claim 5, characterized in that the strip (38*a*) cooperates with at least one tooth (22*b*) of the secondary band (14*b*) in such manner as to immobilize the strip (38*a*) on the belt (14) in the direction of forward movement of the belt (14).

7. The conveyor device (10) as claimed in claim 1, characterized in that the secondary band (14*b*) is produced in a plurality of sections (18*b*) that are arranged end-to-end and each of which is connected to the main band (14*a*) to move therewith by said connecting means (24), and in that a plurality of support devices (34) are attached to each section (18*b*) by said attachment means (36).

8. The conveyor device (10) as claimed in claim 1, characterized in that the means (36) for connecting the secondary band (14*b*) to the main band (14*a*) include at least one first clamp (26) and one second clamp (28*a*) that extend vertically face-to-face and are connected to each other, the main band (14*a*) and the secondary band (14*b*) being disposed and clamped between the clamps (26, 28*a*) in such manner as to connect said bands (14*a*, 14*b*) to each other, and in that at least the first clamp (26) cooperates with at least one tooth (22*b*) of the secondary band (14*b*) and one tooth (22*a*) of the main band (14*a*) in such manner as to immobilize said bands (14*a*, 14*b*) relative to each other in the direction of forward movement of the belt (14).

9. The conveyor device (10) as claimed in claim 1, characterized in that the belt (14) includes an additional secondary band (14*c*) that is of symmetrical design to the secondary band (14*b*) in a horizontal plane of symmetry passing through the main band (14*a*).

10. The conveyor device (10) as claimed in claim 2, characterized in that each rotary element (16*a*, 16*b*), forming a toothed wheel, delimits a series of teeth that cooperate with a series of complementary vertical teeth (22*a*) of the main band (14*a*) of the belt (14) in order to drive movement of the belt (14).

11. The conveyor device (10) as claimed in claim 2, characterized in that the belt (14) includes an additional secondary band (14*c*) that is of symmetrical design to the secondary band (14*b*) in a horizontal plane of symmetry passing through the main band (14*a*).

* * * * *